(12) United States Patent
Shim et al.

(10) Patent No.: US 7,436,146 B2
(45) Date of Patent: Oct. 14, 2008

(54) STEPPING MOTOR SPEED CONTROL METHOD AND APPARATUS SUITABLE FOR THE SAME

(75) Inventors: Jun-seok Shim, Seongnam-si (KR); Boldyrev Serguei, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 11/251,907

(22) Filed: Oct. 18, 2005

(65) Prior Publication Data

US 2006/0176006 A1 Aug. 10, 2006

(30) Foreign Application Priority Data

Feb. 4, 2005 (KR) .................. 10-2005-0010817

(51) Int. Cl.
*H02P 8/14* (2006.01)
(52) U.S. Cl. ..................................... 318/685
(58) Field of Classification Search ............. 318/138, 318/254, 439, 700, 696, 685, 701, 400.01
See application file for complete search history.

(56) References Cited

U.S. PATENT DOCUMENTS

| | | | | |
|---|---|---|---|---|
| 3,828,234 A | * | 8/1974 | Goldberg | 388/820 |
| 4,255,693 A | * | 3/1981 | Keidl | 318/685 |
| 4,580,084 A | * | 4/1986 | Takahashi et al. | 388/844 |
| 4,622,499 A | * | 11/1986 | Squires et al. | 318/400.04 |
| 4,739,346 A | * | 4/1988 | Buckley | 346/138 |
| 4,755,729 A | * | 7/1988 | Gotou | 388/809 |
| 4,816,723 A | * | 3/1989 | Shields et al. | 388/812 |
| 5,204,601 A | * | 4/1993 | Hirata et al. | 318/606 |
| 5,239,245 A | * | 8/1993 | Lee | 318/567 |
| 5,760,359 A | * | 6/1998 | Nakano et al. | 318/603 |
| 5,894,209 A | * | 4/1999 | Takagi et al. | 318/696 |

FOREIGN PATENT DOCUMENTS

| | | |
|---|---|---|
| JP | 03-132380 | 6/1991 |
| JP | 8-116694 A | 5/1996 |
| JP | 2000-287497 | * 10/2000 |
| JP | 2000-287497 A | 10/2000 |
| JP | 2000287497 | 10/2000 |

* cited by examiner

*Primary Examiner*—Bentsu Ro
(74) *Attorney, Agent, or Firm*—Sughrue Mion, PLLC (57) ABSTRACT

A speed control method of controlling a stepping motor to have a uniform instantaneous speed and an apparatus suitable for the same are provided. The stepping motor speed control method includes: calculating a repeated speed error for each phase while rotating a stepping motor at a constant speed and storing the calculated repeated speed error phase by phase; measuring a rotation speed of the stepping motor; sequentially and repeatedly reading the stored repeated speed errors phase by phase by synchronizing with the rotation of the stepping motor; and controlling the speed of the stepping motor with reference to the target speed, the measured speed and the repeated speed error for each phase. Accordingly, the stepping motor speed control apparatus rotates a stepping motor at a uniform instantaneous speed by controlling a rotation speed of the stepping motor phase by phase.

11 Claims, 7 Drawing Sheets

Tal = Tb

FIG. 5

| Run | Drv#1 1st | Drv#1 2nd | Drv#1 3rd | Drv#1 Avg | Drv#2 1st | Drv#2 2nd | Drv#2 3rd | Drv#2 Avg | Drv#3 1st | Drv#3 2nd | Drv#3 3rd | Drv#3 Avg | Drv#4 1st | Drv#4 2nd | Drv#4 3rd | Drv7 | Drv#5 1st | Drv#5 2nd | Drv#5 3rd | Drv1 |
|---|---|---|---|---|---|---|---|---|---|---|---|---|---|---|---|---|---|---|---|---|
| | 1"Drv | | | | | | | | | | | | 0.85"Drv | | | | | | | |
| 1 | -0.16 | -0.14 | -0.17 | -0.16 | -0.20 | -0.18 | -0.19 | -0.19 | -0.08 | -0.07 | -0.06 | -0.07 | 0.03 | 0.02 | 0.02 | 0.02 | -0.08 | -0.08 | -0.07 | -0.08 |
| 2 | 0.11 | 0.11 | 0.11 | 0.11 | 0.10 | 0.13 | 0.12 | 0.12 | -0.02 | -0.09 | -0.01 | -0.04 | -0.05 | -0.06 | -0.06 | -0.06 | 0.02 | 0.02 | 0.02 | 0.02 |
| 3 | 0.02 | -0.02 | 0.01 | 0.02 | -0.01 | 0.01 | 0.00 | 0.00 | 0.09 | 0.09 | 0.10 | 0.09 | -0.01 | -0.01 | -0.01 | -0.01 | 0.04 | 0.05 | 0.05 | 0.05 |
| 4 | -0.08 | -0.07 | -0.09 | -0.08 | -0.07 | -0.08 | -0.06 | -0.07 | -0.15 | -0.19 | -0.15 | -0.16 | 0.12 | 0.11 | 0.11 | 0.12 | -0.08 | -0.08 | -0.08 | -0.08 |
| 5 | 0.04 | 0.05 | 0.02 | 0.04 | -0.01 | 0.00 | 0.00 | 0.00 | 0.08 | 0.07 | 0.07 | 0.07 | -0.13 | -0.13 | -0.13 | -0.13 | 0.04 | 0.05 | 0.04 | 0.04 |
| 6 | 0.08 | 0.08 | 0.08 | 0.08 | 0.11 | 0.11 | 0.12 | 0.12 | 0.01 | -0.01 | 0.01 | 0.00 | 0.05 | 0.05 | 0.05 | 0.05 | 0.05 | 0.07 | 0.06 | 0.06 |
| 7 | -0.15 | -0.15 | -0.16 | -0.15 | -0.18 | -0.19 | -0.17 | -0.18 | -0.02 | -0.06 | -0.03 | -0.04 | 0.04 | 0.03 | 0.03 | 0.03 | -0.07 | -0.09 | -0.06 | -0.07 |
| 8 | 0.10 | 0.11 | 0.10 | 0.10 | 0.11 | 0.10 | 0.11 | 0.10 | -0.03 | -0.01 | -0.01 | -0.01 | -0.05 | -0.05 | -0.06 | -0.05 | -0.03 | 0.02 | 0.03 | 0.03 |
| 9 | 0.02 | 0.01 | 0.00 | 0.01 | 0.02 | 0.00 | 0.02 | 0.01 | 0.13 | 0.11 | 0.14 | 0.13 | -0.04 | -0.04 | -0.03 | -0.04 | 0.11 | 0.09 | 0.10 | 0.10 |
| 10 | -0.08 | -0.09 | -0.09 | -0.09 | -0.06 | -0.10 | -0.06 | -0.08 | -0.12 | -0.13 | -0.10 | -0.12 | 0.14 | 0.13 | 0.14 | 0.14 | -0.10 | -0.12 | -0.10 | -0.11 |
| 11 | 0.04 | -0.02 | 0.03 | 0.03 | 0.00 | -0.02 | 0.00 | -0.01 | 0.05 | 0.09 | 0.06 | 0.07 | -0.18 | -0.18 | -0.17 | -0.18 | 0.07 | 0.06 | 0.07 | 0.07 |
| 12 | 0.09 | -0.10 | 0.07 | 0.09 | 0.15 | 0.11 | 0.14 | 0.14 | 0.02 | 0.03 | 0.03 | 0.03 | 0.10 | 0.11 | 0.12 | 0.11 | 0.05 | 0.05 | 0.04 | 0.04 |
| 13 | -0.15 | -0.17 | -0.17 | -0.17 | -0.19 | -0.17 | -0.19 | -0.18 | -0.02 | 0.00 | -0.04 | -0.02 | 0.01 | 0.00 | 0.01 | 0.01 | -0.06 | -0.06 | -0.05 | -0.06 |
| 14 | 0.11 | 0.10 | 0.09 | 0.10 | 0.13 | 0.15 | 0.14 | 0.14 | -0.04 | -0.02 | -0.04 | -0.03 | -0.07 | -0.07 | -0.06 | -0.07 | 0.01 | 0.01 | 0.00 | 0.01 |
| 15 | 0.01 | 0.01 | 0.05 | 0.02 | 0.03 | 0.04 | 0.03 | 0.03 | 0.13 | 0.15 | 0.11 | 0.13 | 0.01 | 0.02 | 0.02 | 0.02 | 0.03 | 0.03 | 0.02 | 0.03 |
| 16 | -0.09 | -0.08 | -0.07 | -0.08 | -0.08 | -0.07 | -0.09 | -0.08 | -0.16 | -0.08 | -0.18 | -0.14 | 0.11 | 0.11 | 0.11 | 0.11 | -0.06 | -0.06 | -0.08 | -0.06 |
| 17 | 0.01 | 0.02 | 0.05 | 0.03 | -0.03 | 0.04 | 0.01 | 0.02 | 0.11 | 0.07 | 0.09 | 0.09 | -0.18 | -0.17 | -0.18 | -0.18 | -0.01 | 0.00 | -0.02 | -0.01 |
| 18 | 0.09 | -0.09 | 0.12 | 0.10 | -0.12 | 0.13 | -0.11 | 0.12 | 0.02 | 0.05 | -0.01 | -0.02 | 0.10 | 0.11 | 0.11 | 0.11 | -0.02 | 0.04 | 0.01 | 0.02 |
| Min | -0.16 | -0.17 | -0.17 | -0.17 | -0.20 | -0.19 | -0.19 | -0.19 | -0.16 | -0.19 | -0.18 | -0.16 | -0.18 | -0.18 | -0.18 | -0.18 | -0.10 | -0.12 | -0.10 | -0.11 |
| Max | 0.11 | 0.11 | 0.12 | 0.11 | 0.15 | 0.15 | 0.14 | 0.14 | 0.13 | 0.15 | 0.14 | 0.13 | 0.14 | 0.13 | 0.14 | 0.14 | 0.11 | 0.09 | 0.10 | 0.10 |
| Sum | 0 | 0 | 0 | 0 | 1E-16 | 0 | 0 | 0 | 0 | 0 | 4E-17 | 0 | 0 | 0 | 0 | 0 | 0 | 0 | 0 | 0 |

STEPPING MOTOR SPEED CONTROL METHOD AND APPARATUS SUITABLE FOR THE SAME

CROSS-REFERENCE TO RELATED PATENT APPLICATION

This application claims priority from Korean Patent Application No. 10-2005-0010817, filed on Feb. 4, 2005, in the Korean Intellectual Property Office, the disclosure of which is incorporated herein in its entirety by reference.

BACKGROUND OF THE INVENTION

1. Field of the Invention

Apparatuses and methods consistent with the present invention relates to a stepping motor speed control method, and more particularly, to controlling a stepping motor to have a uniform instantaneous speed and an apparatus suitable for the same.

2. Description of the Related Art

The disks of a hard disk drive (HDD) are rotably driven by a spindle motor. Further, the process of booting an HDD begins after the spindle motor reaches a normal speed. An index pulse, which is generated by the spindle motor, is used as a reference of all operations of an HDD, such as formatting, servo writing and diagnosis.

With respect to disk rotation speed of an HDD, 3,600 rpm was mainly used several years ago. Presently, 4,200 rpm is mainly used for IDE-based low price and low performance types. 5,400 rpm is mainly used for intermediate and low price types, and 7,200 rpm is mainly used for high price and high performance types. For SCSI HDDs, 7,200 to 10,000 rpm spindle motors are used, and it is predicted that spindle motors of over 12,000 rpm will be used in the future.

A core element of spindle motors involves maintaining a uniform speed within a standard corresponding to +/−0.1% (4~5 rpm) of a rated speed. If a spindle motor is not maintained in the uniform speed, read errors may occur even if the surfaces of the disks of the HDD are normal. In a severe case, the HDD cannot be used if the uniform speed is not maintained Stepping motors are commonly used as the spindle motors for an HDD.

A stepping motor is a motor rotates at a constant angle by inputting an external DC voltage or current to each phase terminal of the motor in a switching method. The stepping motor is a kind of digitally controlled device which is suitable for a digital pulse type of speed control. That is, the stepping motor rotationally moves by a rotation angle corresponding to one step in response to one digital pulse and continuously moves in proportion to the number of pulses and a pulse input speed per unit time.

The stepping motor operates by intermittent driving, continuous rotation driving, forward/reverse driving, shift driving and micro step driving. With intermittent driving, one step driving for one hour or one step driving for one day can be easily realized, and by, using the micro step driving, ultra-fine step angle driving can be realized. Also, an optimal rotation angle can be controlled in response to the number of input pulses if continuous rotation driving is used.

For an HDD, there are three methods to measure a speed of a spindle motor. An index method measures a period of an index signal which is generated every one revolution of a stepping motor, a servo gate method measures a detection period of a servo signal which is recorded on a rotating disk, and a back electromotive force (EMF) method measures a period of a back EMF signal of a stepping motor.

The servo gate method is not widely used due to signal loss caused by defective sectors and a requirement of a wide bandwidth for servo signal detection.

The index method is robust against measurement noise and is commonly used for 3.5" HDDs. The back EMF method has an advantage in that a speed of a stepping motor can be finely controlled phase by phase while having a disadvantage in that noise according to a shape of a stepping motor, i.e., fluctuation of an instantaneous speed, is high.

Figure 1:
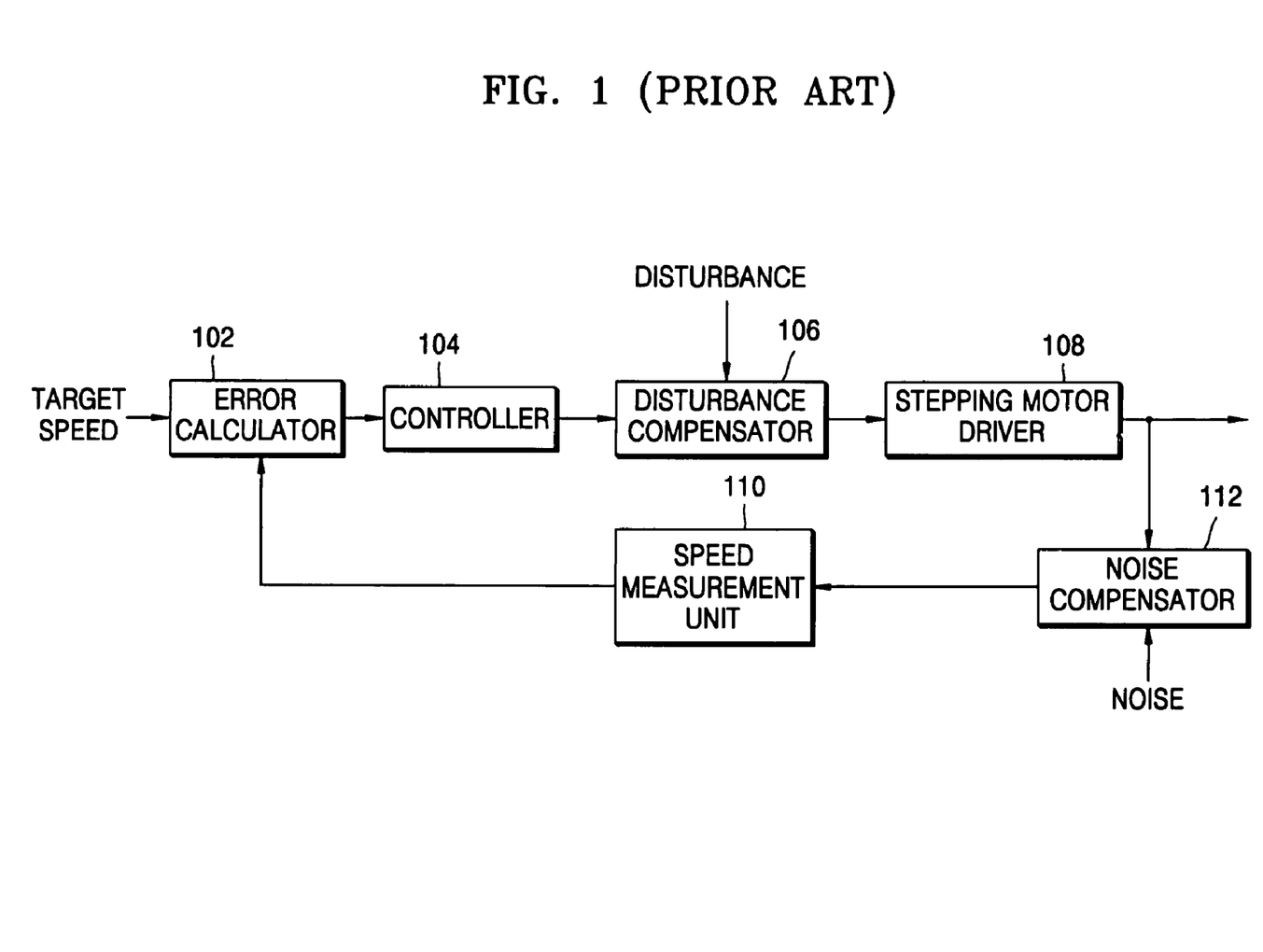
FIG. 1 is a block diagram of a conventional stepping motor speed control apparatus.

FIG. 1 is a block diagram of a conventional stepping motor speed control apparatus, showing an example of the back EMF method.

Referring to FIG. 1, the stepping motor speed control apparatus includes an error calculator 102, a controller 104, a disturbance compensator 106, a stepping motor driver 108, a speed measurement unit 110 and a noise compensator 112.

The speed measurement unit 110 measures a rotation speed of a stepping motor and outputs a pulse signal according to rotation of the stepping motor by wave-shaping a back EMF signal.

Figure 2:
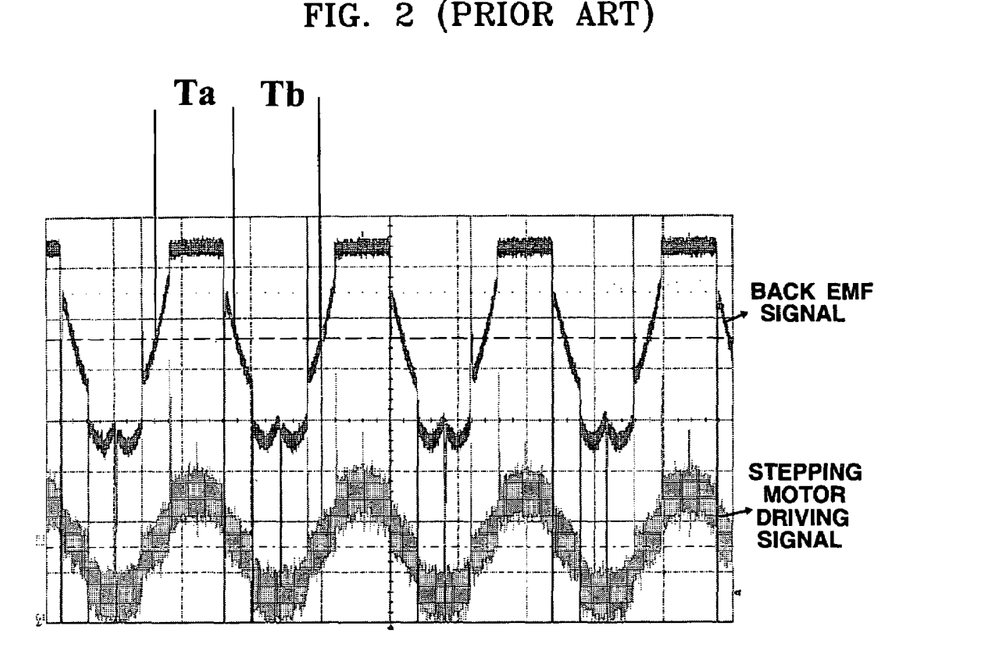
FIG. 2 is a waveform diagram illustrating a correlation between a stepping motor driving signal and a back EMF.

FIG. 2 is a waveform diagram illustrating a correlation between a stepping motor driving signal and the back EMF signal.

In FIG. 2, the upper waveform denotes the back EMF signal, and the lower waveform denotes the stepping motor driving signal which is supplied by the stepping motor driver 108.

The stepping motor rotates one phase by one phase in response to a positive half wave and a negative half wave of a sinusoidal signal supplied by the stepping motor driver 108. Since N-poles and S-poles of stators in the stepping motor are alternatively deployed, polarity of a signal for rotating a rotor according to these magnetic poles should be changed phase by phase.

The speed measurement unit 110 calculates the rotation speed of the stepping motor by detecting a period of the back EMF signal. The measured speed calculated by the speed measurement unit 110 is supplied to the error calculator 102 as one input.

The error calculator 102 calculates an error between a target speed and the measured speed.

The controller 104 performs a control operation which compensates for the error calculated by the error calculator 102. For example, if the stepping motor rotates faster than the target speed, the controller 104 decreases a frequency of a driving pulse, and if the stepping motor rotates slower than the target speed, the controller 104 increases the frequency of the driving pulse.

The stepping motor driver 108 drives the stepping motor by receiving the driving pulse output from the controller 104. In detail, the stepping motor driver 108 receives the driving pulse output from the controller 104 and generates the stepping motor driving signal shown in the lower part of FIG. 2. The disturbance compensator 106 compensates for disturbance supplied to the stepping motor, and the noise compensator 112 compensates for measurement noise.

Figure 3:
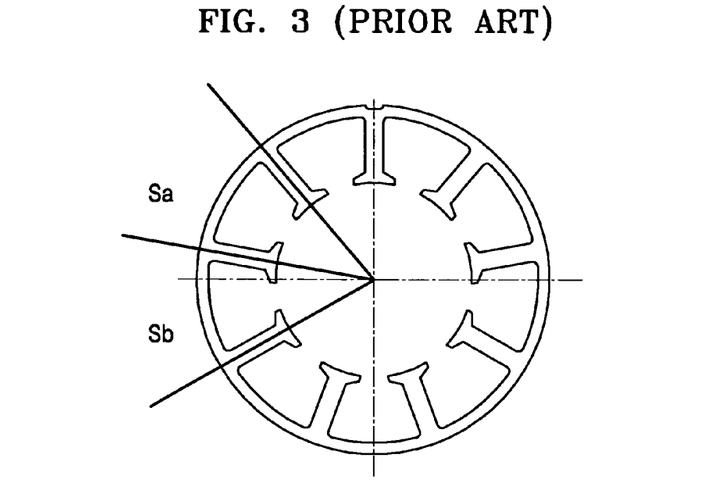
FIG. 3 is a schematic diagram of a stepping motor.

FIG. 3 is a schematic diagram of a stepping motor having 4 pairs of stators. The stepping motor moves by one step for one pulse input, i.e., by a distance between a stator and a neighboring stator. It is preferable that the distance between a stator and a neighboring stator is constant. However, the distance is not uniform in reality due to mechanical inaccuracy. This non-uniformity is reflected to a back EFM signal as it is.

Figure 4:
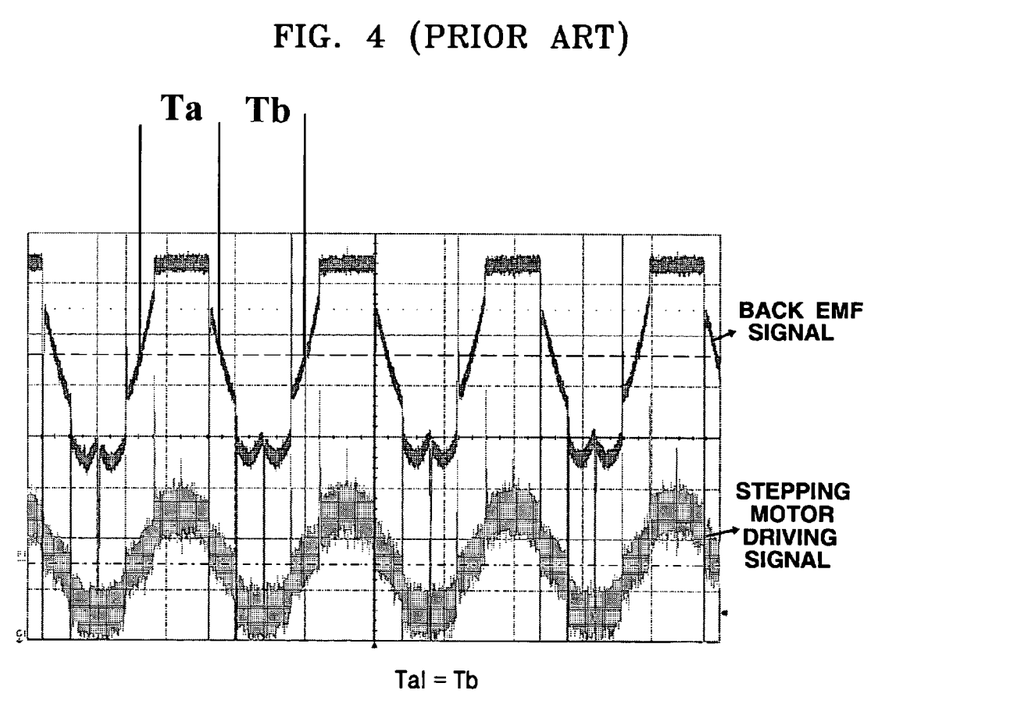
FIG. 4 is a waveform diagram illustrating a back EMF signal generated when distances between stators are ununiform.

FIG. 4 is a waveform diagram illustrating the back EMF signal which is generated when distances between stators are not uniform. The back EMF signal is generated by rotation of the spindle motor. Referring to FIG. 4, when the distances between stators are Sa and Sb, Ta and Tb denote time stator intervals required for the stepping motor to move by Sa and Sb, respectively.

The time stator intervals Ta and Tb are ideally equal to each other. However, in most cases, Ta and Tb will not be equal to each other due to mechanical inaccuracy. This non-uniformity of Ta and Tb results in instability of speed control.

A width of an input pulse corresponds to a distance between stators. Widths of the input pulse are uniform since it is considered that distances between stators are uniform.

However, as shown with reference to FIGS. 3 and 4, the distances between stators are not uniform, thereby causing a speed of the stepping motor, in particular an instantaneous speed, not to be uniform.

SUMMARY OF THE INVENTION

The present invention provides a speed control method of controlling an instantaneous speed to be uniform in a speed control apparatus of a stepping motor controlling its speed phase by phase.

The present invention also provides an apparatus suitable for the speed control method.

According to an aspect of the present invention, there is provided a stepping motor speed control method comprising: calculating a repeated speed error for each phase of rotation of the stepping motor which is rotating at a constant speed and storing the repeated speed error which is calculated phase by phase; measuring a rotation speed of the stepping motor; sequentially and repeatedly reading the repeated speed errors, which are stored, phase by phase by synchronizing the repeated speed errors with the rotation of the stepping motor; and controlling the speed of the stepping motor with reference to the target speed, the rotation speed which is measured and the repeated speed error for each phase.

According to another aspect of the present invention, there is provided a stepping motor speed control apparatus comprising: a speed measurement unit which measures a rotation speed of a stepping motor; a repeated speed error compensator which stores a repeated speed error of the stepping motor phase by phase and outputs the repeated speed error which corresponds to each phase; an error calculator which calculates a speed error based on a target speed, the measured speed output from the speed measurement unit, and the repeated speed error which corresponds to each phase which is output from the repeated speed error compensator; and a controller which drives the stepping motor with reference to an error signal which is output from the error calculator and the target speed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Hereinafter, exemplary embodiments of the present invention will now be described in detail with reference to the accompanying drawings.

Figure 5:
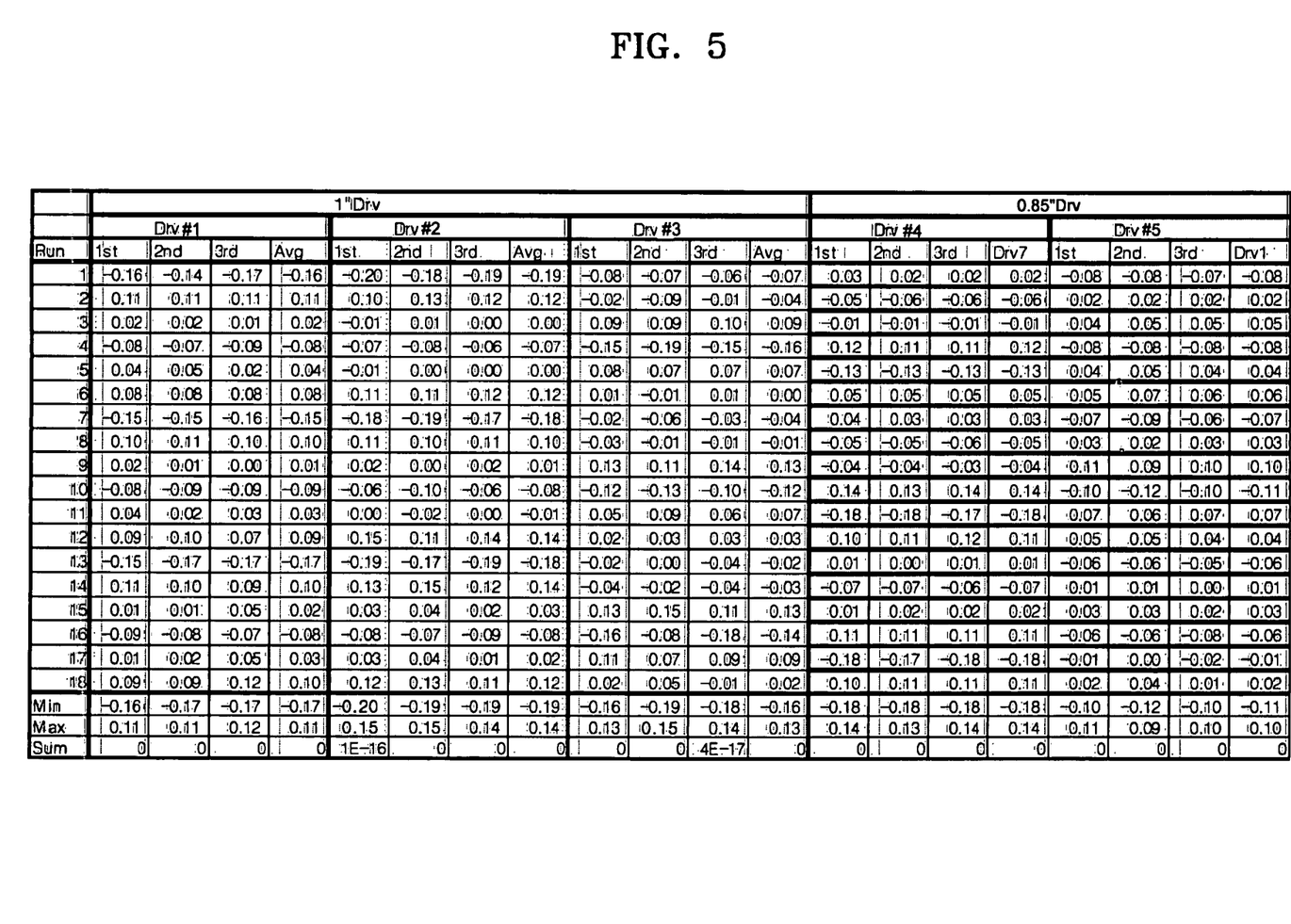
FIG. 5 is a table showing results obtained by measuring repeated speed errors for each phase in stepping motors applied to HDDs.

FIG. 5 is a table showing results obtained by measuring repeated speed errors for each phase in stepping motors of HDDs. The measurement is performed for three 1" HDDs (#1, #2 and #3) and two 0.85" HDDs (#4 and #5), thereby resulting in repeated speed errors for the first to eighteenth phases with respect to constant rates of rotation. Herein, for the constant rates of rotation, three different values are applied. A phase of a stepping motor indicates a position of a rotor, and the 18 phases refer to one revolution of the stepping motor which is divided into 18 angles.

For example, according to FIG. 5, a speed error −0.16 in the first phase with respect to a first rotation speed indicates that the speed error in the first phase is −0.16 when the stepping motor is rotated in response to the first rotation speed.

Referring to FIG. 5, speed errors in each phase are not uniform, thereby indicating that the stepping motors partially rotate at an ununiform speed. Also, "Min," "Max" and "Sum" shown in the bottom of FIG. 5 denote each minimum, maximum and sum values, respectively, of speed errors according to phases for one revolution of the stepping motors. For example, the values "Min=−0.16" and "Max=0.11" which are located at the left-bottom indicate that speed errors according to the phases are generated by −0.16 in the minimum and 0.11 in the maximum. Also, a value "Sum=0" indicates that a speed error corresponding to an entire one revolution of the stepping motor is 0. Thus, an average speed of the stepping motor is constant but speeds according to phases, i.e., instantaneous speeds are not uniform.

Figure 6:
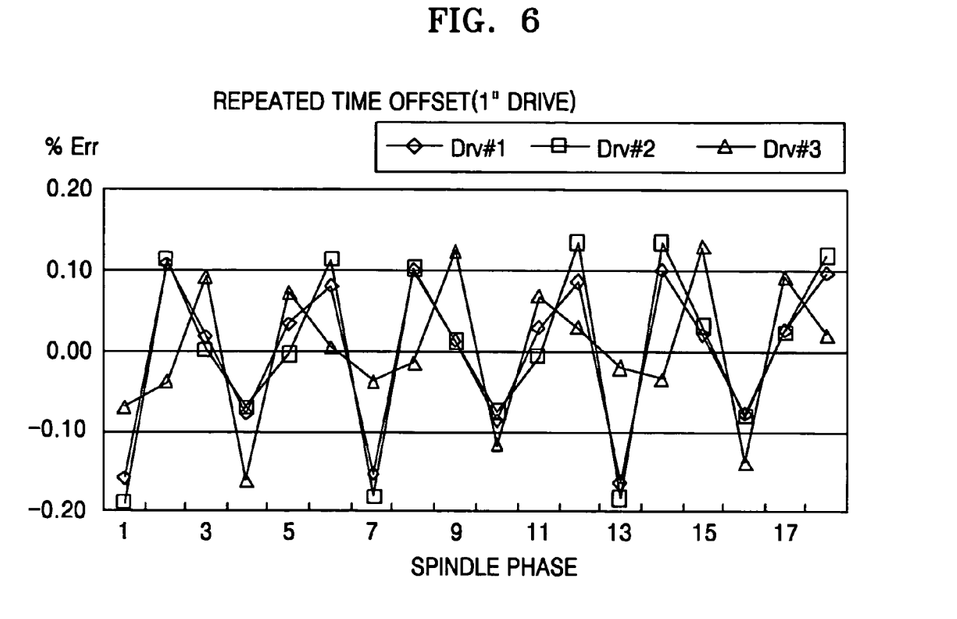
FIGS. 6 and 7 are graphs illustrating the repeated speed errors of 1" HDDs and 0.85" HDDs shown in FIG. 5.
Figure 7:
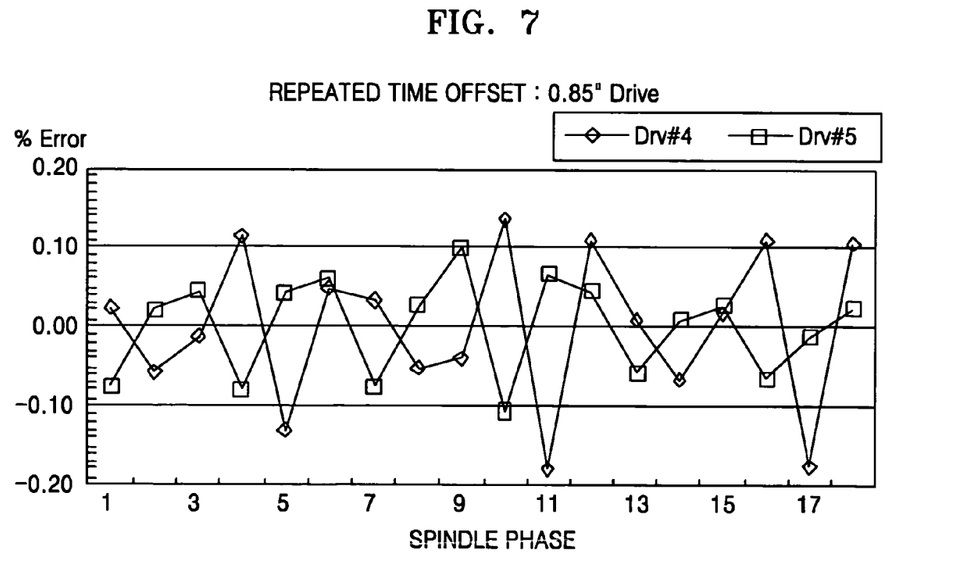

FIGS. 6 and 7 are graphs illustrating the repeated speed errors of the 1" HDDs and the 0.85" HDDs shown in FIG. 5.

Figure 8:
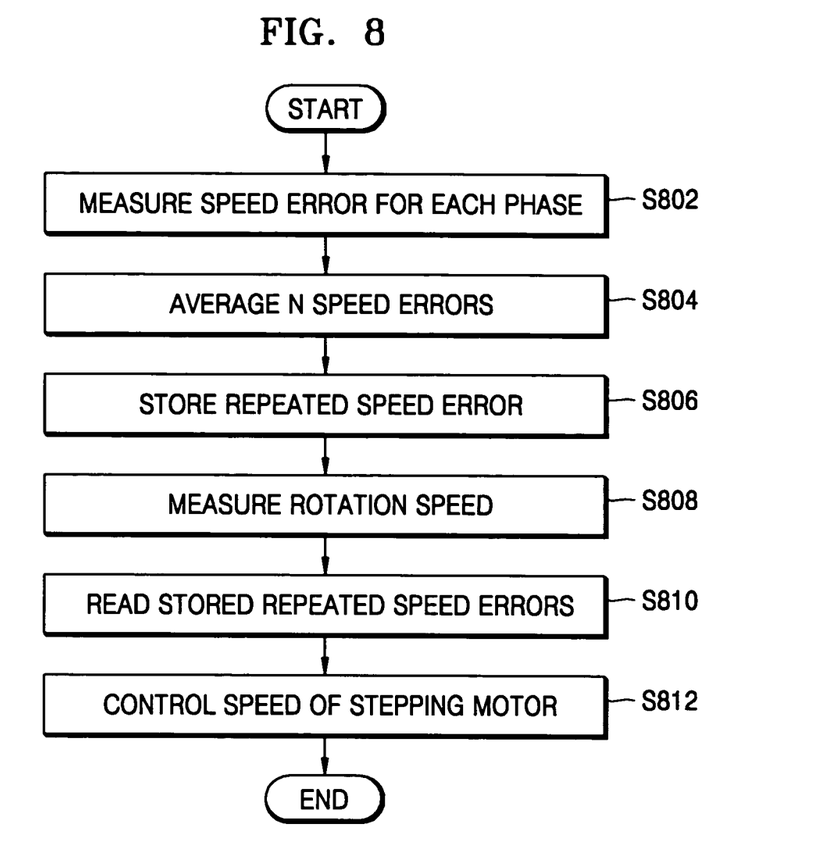
FIG. 8 is a flowchart illustrating a stepping motor speed control method according to an embodiment of the present invention.

FIG. 8 is a flowchart illustrating a stepping motor speed control method according to an exemplary embodiment of the present invention.

According to the stepping motor speed control method, instantaneous speeds are uniformly controlled by compensating for speed errors for phases of a stepping motor. Here, the speed errors for phases are measured form the stepping motor which is rotating at a constant average speed. That is, in the stepping motor speed control method, a speed control is performed by controlling the speed based on a target speed and measured speeds and compensating for minute errors which are due to non-uniformity for phases of the stepping motor phase by phase.

Speed errors are measured for each phase while the stepping motor is being rotated at a constant average speed in operation S802.

In operation S804, an average value of the speed errors for each phase is determined by repeating operation S802 by a predetermined number N. As a result, the average value of the speed errors for each phase, i.e., a repeated speed error, is obtained.

Figure 9:
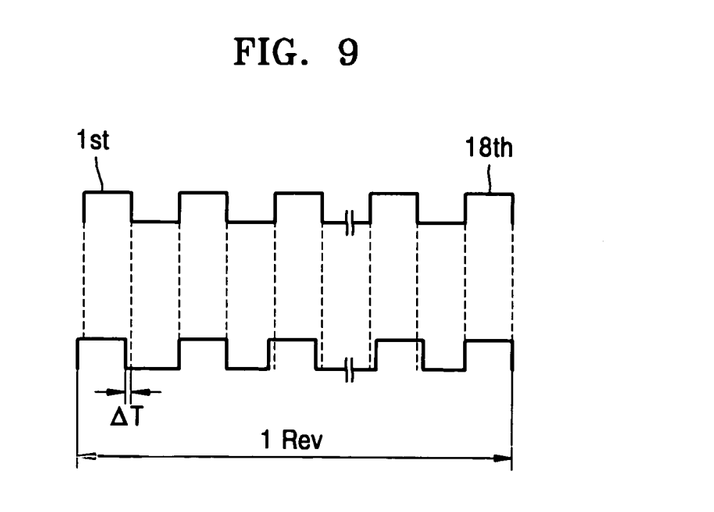
FIG. 9 is a waveform diagram illustrating how to obtain repeated speed errors in the speed control method according to the embodiment of the present invention.

FIG. 9 is a waveform diagram illustrating how to obtain the repeated speed error in the speed control method according to an exemplary embodiment of the present invention. In FIG. 9, the upper waveform is a stepping motor driving pulse, and the lower waveform is a pulse which is obtained by wave-shaping a back EMF signal, wherein the stepping motor driving pulse has a constant period while the back EMF signal of the stepping motor driven by the stepping motor driving pulse has a small deviation at each phase. This deviation is generated by a mechanical non-uniformity of the stepping motor, and in particular, by non-uniformity of distances between stators, thereby causing an instantaneous speed to be changed while the stepping motor is rotating at the constant average speed.

In the present exemplary embodiment, the stepping motor is controlled to rotate at a uniform instantaneous speed by compensating for the speed deviation at each phase shown in FIG. 9. Here, the speed errors for each phase are represented by the average value obtained by the N measurements, i.e., the repeated speed error.

The repeated speed error is stored phase by phase in operation S806.

A rotation speed for each phase of the stepping motor is measured in operation S808.

The stored repeated speed errors are sequentially and repeatedly read phase by phase by synchronizing the repeated speed errors for each phase with an index signal of the stepping motor in operation S810.

In operation S812, speed errors are calculated with reference to the target speed, the measured speeds for phases and the repeated speed errors for phases, and a speed of the stepping motor is controlled based on the speed errors which are calculated.

According to the speed control method, the stepping motor can maintain a uniform instantaneous speed by compensating for the speed errors at phases due to the mechanical non-uniformity of the stepping motor by using the repeated speed errors to control the speed of the stepping motor.

Figure 10:
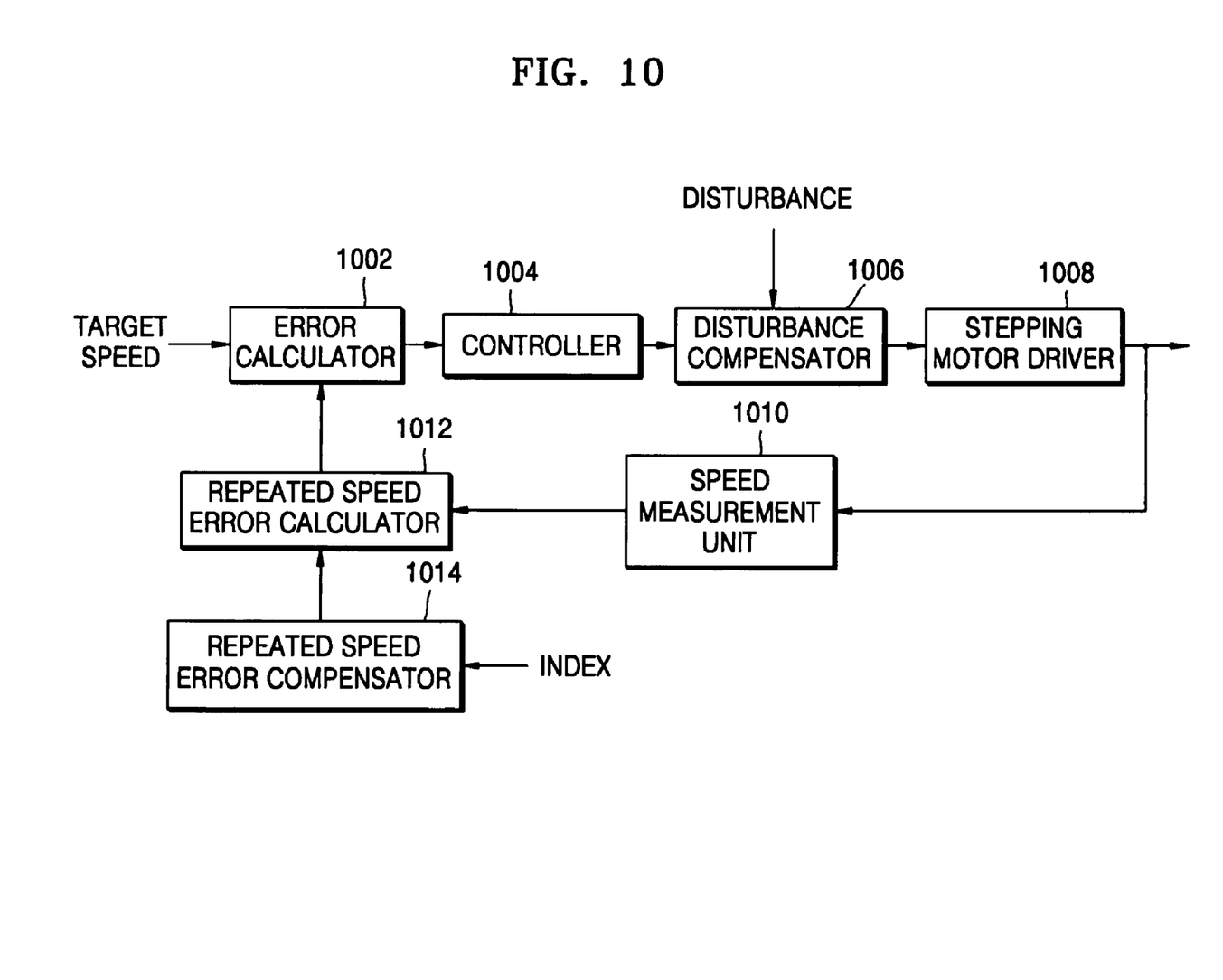
FIG. 10 is a block diagram of a stepping motor speed control apparatus according to an embodiment of the present invention.

FIG. 10 is a block diagram of a stepping motor speed control apparatus according to an exemplary embodiment of the present invention.

Referring to FIG. 10, the stepping motor speed control apparatus includes an error calculator 1002, a controller 1004, a disturbance compensator 1006, a stepping motor driver 1008, a speed measurement unit 1010, a repeated speed error calculator 1012 and a repeated speed error compensator 1014.

The speed measurement unit 1010 measures a rotation speed of a stepping motor, obtains a pulse signal in response to the rotation of the stepping motor by wave-shaping a back EMF signal, and measures the rotation speed of the stepping motor phase by phase by calculating a period of the pulse signal.

The measured speed output from the speed measurement unit 1010 is supplied to the repeated speed error calculator 1012 as one input.

A repeated speed error for each output from the repeated speed error compensator 1014 is supplied to the repeated speed error calculator 1012 as the other input.

The repeated speed error compensator 1014 stores the repeated speed errors for phases shown in FIG. 7 or 8 and outputs a repeated speed error corresponding to each phase. The repeated speed error compensator 1014 can be implemented by use of a memory.

An index signal is supplied to the repeated speed error compensator 1014 to determine the repeated speed error corresponding to each phase. The index signal is a signal which indicates a reference position of the stepping motor. That is, the repeated speed error compensator 1014 outputs the repeated speed error corresponding to each phase by synchronizing the repeated speed error for each phase with the index signal.

Due to an operation of the repeated speed error calculator 1012, the error calculator 1002 calculates a speed error based on a target speed, the measured speed output from the speed measurement unit 1010 and the repeated speed error for each phase output from the repeated speed error compensator 1014.

The controller 1004 performs a control to compensate for the error calculated by the error calculator 1002. The stepping motor driver 1008 drives the stepping motor by receiving a driving pulse which is output from the controller 1004.

The present invention may be realized as a method, an apparatus, and/or a system. When the present invention is realized as software, components of the present invention are embodied as code segments for executing required operations. A program or the code segments can be stored in a processor readable recording medium and transmitted as computer data signals combined with a carrier using a transmission medium or a communication network. The processor readable recording medium may be any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, hard discs, optical fiber media, and RF networks. The computer data signals may include any signal which can be propagated via transmission media such as electronic network channels, optical fibers, air, electronic fields, RF networks.

As described above, a stepping motor speed control apparatus according to exemplary embodiments of the present invention rotates a stepping motor at a uniform instantaneous speed by controlling a rotation speed of the stepping motor phase by phase.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling speed of a stepping motor, the method comprising:
    calculating a repeated speed error for each phase of rotation of the stepping motor which rotates at a constant speed and storing the repeated speed error which is calculated phase by phase;
    measuring a rotation speed of the stepping motor;
    sequentially and repeatedly reading the repeated speed errors, which are stored, phase by phase by synchronizing the repeated speed errors with the rotation of the stepping motor; and
    controlling the speed of the stepping motor with reference to a target speed, the rotation speed which is measured and the repeated speed error for each phase.

2. The method of claim 1, wherein the repeated speed errors are stored according to a specific timing signal.

3. The method of claim 2, wherein the specific timing signal is an index signal of the stepping motor.

4. The method of claim 1, wherein the repeated speed error for each phase is read by synchronizing the repeated speed error for each phase with an index signal of the stepping motor.

5. The method of claim 1, wherein in the measuring of the rotation speed, the rotation speed of the stepping motor is measured phase by phase.

6. A apparatus for controlling the speed of a stepping motor, the apparatus comprising:
 a speed measurement unit which measures a rotation speed of the stepping motor;
 a repeated speed error compensator which stores a repeated speed error of the stepping motor phase by phase and outputs the repeated speed error which corresponds to each phase;
 an error calculator which calculates a speed error based on a target speed, the measured speed output from the speed measurement unit, and the repeated speed error which corresponds to each phase which is output from the repeated speed error compensator; and
 a controller which drives the stepping motor with reference to an error signal which is output from the error calculator and the target speed.

7. The method of claim 6, wherein the repeated speed errors are stored according to a specific timing signal.

8. The method of claim 7, wherein the specific timing signal is an index signal of the stepping motor.

9. The apparatus of claim 6, wherein the speed measurement unit obtains a pulse signal in response to the rotation of the stepping motor by wave-shaping a back electromotive force signal which is generated by the stepping motor and measures the rotation speed of the stepping motor phase by phase by calculating a period of the pulse signal.

10. The apparatus of claim 6, wherein the repeated speed error compensator stores an average value of speed errors for phases of the stepping motor rotating at a predetermined average speed.

11. The apparatus of claim 6, wherein the repeated speed error compensator outputs a speed error for each phase by synchronizing the repeated speed error which corresponds to each phase with an index signal which is generated by the stepping motor.

* * * * *